US008676215B2

(12) United States Patent
Zou et al.

(10) Patent No.: US 8,676,215 B2
(45) Date of Patent: Mar. 18, 2014

(54) METHOD AND APPARATUS FOR INTERFERENCE SUPPRESSION IN HETEROGENOUS NETWORKS

(75) Inventors: Jialin Zou, Randolph, NJ (US); Subramanian Vasudevan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 455 days.

(21) Appl. No.: 12/954,057

(22) Filed: Nov. 24, 2010

(65) Prior Publication Data

US 2012/0129536 A1 May 24, 2012

(51) Int. Cl.
*H04W 36/00* (2009.01)
(52) U.S. Cl.
USPC .......................................... 455/444; 370/338
(58) Field of Classification Search
USPC .......................................... 455/444; 370/338
See application file for complete search history.

(56) References Cited

U.S. PATENT DOCUMENTS

2007/0036079 A1* 2/2007 Chowdury et al. ........... 370/235
2009/0196174 A1* 8/2009 Ji ................................ 370/230.1

\* cited by examiner

*Primary Examiner* — Marcos Batista
(74) *Attorney, Agent, or Firm* — J. B. MacIntyre

(57) ABSTRACT

A method is provided a wireless system for providing an interference suppression zone in a portion of the macro cell coverage area bordering the small-cell coverage area for a small cell, but outside that small-cell coverage area. The transmission power of a UE located within the interference suppression zone is minimized to minimize the inter-cell interference to the small cells. The invention methodology further operates to enhance the redirection/redistribution methods of the art for UEs located in the interference suppression zone, further reducing macro to small cell interference. In further embodiments of the invention, methods are provided for determining the scope of an interference suppression zone and for determining proximity of an UE to the interference suppression zone.

15 Claims, 1 Drawing Sheet

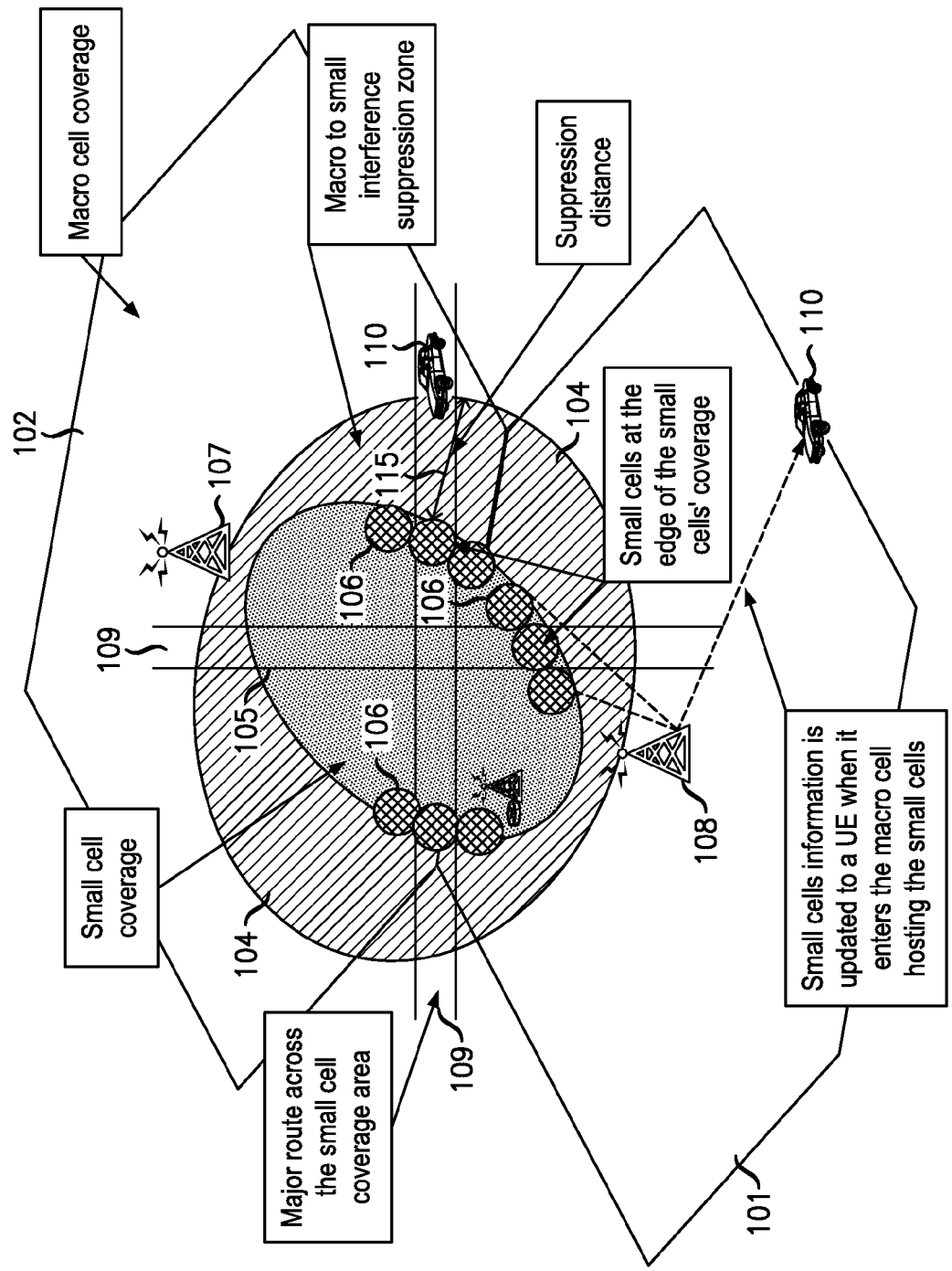

METHOD AND APPARATUS FOR INTERFERENCE SUPPRESSION IN HETEROGENOUS NETWORKS

FIELD OF THE INVENTION

The present invention generally relates to managing interference in a wireless communications system.

BACKGROUND OF THE INVENTION

In wireless communications systems of the art, a variety of transmission protocols have been developed for providing wireless service to users. Exemplary network services based on such transmission protocols include High Rate Packet Data (HRPD), Long Term Evolution (LTE) and Universal Mobile Telecommunications System (UMTS). Each of these network services is defined in terms of a particular Radio Access Technology (RAT), and, in general, the RAT defining each different transmission protocol requires a unique RF configuration for transmission and reception of communications based on a given RAT.

Heterogeneous networks (HetNets) are now being developed wherein cells of smaller size are embedded within the coverage area of larger macro cells, primarily to provide increased capacity in targeted areas of data traffic concentration. Such heterogeneous networks try to exploit the spatial variations in user (and traffic) distribution to efficiently increase the overall capacity of the wireless network.

Based on the cell size, Heterogeneous networks are generally classified according to two major types: Large cells, which include macro cells and macro relays; and Small cells, which include micro cells, pico cells, Home evolved node B (HeNB)/femto cells (usually privately maintained) and small relays. It is a common deployment scenario that macro coverage is overlaid with spotty small cell coverage. A mobile station, or User Equipment (UE), communicating with a macro cell base station will normally do so at a higher transmission power level than for a link from the mobile/UE to a (usually nearby) overlaid small cell and this transmission power difference often creates significant interference management problems in the HetNet.

Additionally, due to a limited spectrum resource, system operators may require sharing of the same carrier by the macro cells and the small cells of the HetNet. In that circumstance, a problem may occur when coverage is overlapped between a macro and one or more small cells. In such coverage overlap, UEs connected with a small cell may experience excessive interference in its reverse link from a nearby UE that is communicating with the macro cell—such UE to macro-cell transmission typically occurring at much higher transmission power levels than for UE to small-cell transmission.

While techniques are generally known for Inter-Cell Interference Coordination (ICIC) among neighboring macro cells, it is difficult to conduct per-UE network controlled ICIC between the macro cell and small cells in a heterogeneous network. Although a few techniques have evolved for addressing such intra-HetNet interference issues—e.g., resource splitting between macro and small cells, such techniques require tight synchronization and complicated scheduling on a per UE basis and generally result in reduced overall spectral efficiency for the network.

SUMMARY OF INVENTION

As described above, the reverse-link macro to small cell interference in a HetNet is mainly caused by much higher transmission power of the UEs communicating with the macro cell in reverse links. The invention provides a methodology for reducing the transmission power of a UE when the UE is close to the small (or pico) cell coverage and also to redirect/redistribute the UEs to the small cells as early as possible such that the macro to small cell interference is minimized.

In a particular embodiment, the invention provides an interference suppression zone in a portion of the macro cell coverage area bordering the small-cell coverage area for a small cell, but outside that small-cell coverage area. The transmission power of a UE located within the interference suppression zone is reduced to minimize the inter-cell interference to the small cells. The invention methodology further operates to enhance the redirection/redistribution methods of the art for UEs located in the interference suppression zone, further reducing macro to small cell interference. In further embodiments of the invention, methods are provided for determining the scope of an interference suppression zone and for determining proximity of a UE to the interference suppression zone.

BRIEF DESCRIPTION OF THE FIGURES

The teachings of the present invention can be readily understood by considering the following detailed description in conjunction with the accompanying drawings, in which:

FIG. 1 provides a schematic depiction of a wireless system arrangement in which the method of the invention may be implemented.

DETAILED DESCRIPTION

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of power transmission interactions among macro cells and small cells in a heterogeneous network to achieve reduced overall interference in a heterogeneous network. While the disclosed invention methodology is described for an exemplary case of a heterogeneous network having at least one macro cell and one or more small cells embedded within the macro cell, the invention methodology is applicable generally to interference management in any network comprising multiple base-station and mobile-station pairs and involving asymmetrical transmission power relationships among those pairs, and the claimed invention is intended to cover all such applications of that methodology. It is also noted that the invention is illustratively described in terms of a wireless system proving service according to the LTE standards, and the E-UTRAN air interface standard associated with such LTE wireless systems, but it should be readily apparent that the inventive concept is applicable to other wireless configuration wherein a macro cell also encompasses one or more small cells operating therewithin.

In heterogeneous networks, it is a very common deployment scenario that macro coverage is overlapped with spotty small (pico/femto) cell coverage, particularly for residential areas and office complexes. In many cases, the system operator will require the macro cells and the small cells to share the same carrier. In such shared-carrier cases, when the macro and small cell coverage areas overlap, a UE connected with the small cell may experience excessive interference from a nearby UE that is communicating with the macro cell. This interference from the macro-linked UE will be particularly acute when the macro-linked UE and a nearby small cell are located at or near the cell edge of the macro cell.

Accordingly, in the circumstance of a UE being connected with the macro cell and located nearby to one or more small cells, but the link condition between the UE and the small cell does not allow the UE to handoff to the small cell, it is desirable to suppress the reverse-link transmission power of the UE in order to minimized the RL interference to the nearby small cells. To address this goal, the inventors have developed the concept of an interference suppression zone that is located in a portion of the macro cell coverage area bordering the small-cell coverage area for a small cell, but outside that small-cell coverage area.

The interference suppression zone concept of the invention is schematically illustrated in FIG. 1. With reference to the FIGURE, an exemplary HetNet is illustrated comprising two adjacent macro cells 101 and 102 having a cluster of small cells 105 overlaid within the coverage area of the macro cells, and illustratively located along the border between the adjacent macro cells. Macro cell 102 is served by base station 107 and macro cell 101 is served by base station 108. Small cell cluster 105, indicated by forward slashing, will typically comprise multiple small cells clustered within an area where such an overlay of small cells can be expected to improve service quality—e.g., an area having a user density greater than can be served effectively by the macro cells.

In the FIGURE, only the outer periphery of the cells comprising the small cell cluster are shown, illustrated as cells 106 (and depicted by reverse slashing), but it should be understood that other similar cells are arrayed within the interior of the cluster to collectively comprise cluster 105. As should also be apparent, the size and location of the cluster of small cells is only illustrative of the concept, and such a cell cluster can be comprised of any number of small cells (even a single small cell, although in practical applications of the invention, such a case is relatively unlikely) and may be located anywhere within the HetNet. Users (or UEs) 110 move about within the HetNet, including at least one user moving along a motor-route or the like 109 traversing the small cell cluster 105 on which the user travels at a relatively high speed.

According to the invention, an interference suppression zone 104 having a variable width 115 is deployed adjacent to and surrounding the outer periphery of the small cell cluster 105. As described more fully hereafter, UEs operating within or near the interference suppression zone 104 are subject to transmission power adjustments for reducing interference to cells of the small cell cluster.

The concept of providing an interference suppression zone according to the invention is premised on the idea that, as a UE approaches a small cell cluster, there will be a range (of distance) in which the UE is still too far from the small cell cluster (or ones of the cells within the cluster) to have sufficient RF connectivity with a small cell to effect hand-off to that cell, but is sufficiently close to the small cell that its reverse link transmissions with another cell (e.g. one of the HetNet macro cells) constitutes serious interference for the small cell. Accordingly, the invention methodology provides for a reduction in UE reverse-link transmission power in that circumstance.

For a UE in active communication with another base station (Radio Resource Control (RRC)_Active state), upon a determination by the UE that it has entered the interference suppression zone for a small cell cluster, the UE first mutes its on-going Best-Effort (BE) traffic, thereby reducing transmission power to the extent needed for transmission of such BE traffic. Preferably, the BE traffic transmission will be stopped for at most a pre-determined period of time. If the UE remained in the interference suppression zone (without achieving hand-off to a small cell) longer than such predetermined period, then the UE could allow some BE traffic transmission at the lowest transmission power (with the associated low data rate).

To the extent the UE has on-going Expedited Forwarding (EF) or Assured Forwarding (AF) traffic, it then operates to reduce the transmission power of such EF and/or AF traffic to the minimum level needed to provide a minimally acceptable QoS support, in order to further reduce reverse-link transmission power. If there is on going voice service, a reduction in the vocoder rate may be utilized.

It should of course be understood that the concept here is that of reducing reverse-link transmission power to the extent consistent with service requirements for given traffic priorities handled by the UE, and is not limited to the illustrative case here of BE, EF and AF traffic.

Once a determination has been made by a UE that it is in the interference suppression zone, and steps have been taken to reduce reverse-link transmission power as described above, the UE starts to search for the nearby small cells. Only a few closest small cells need be searched based on location info. This will reduce the UE power consumption. Optionally, the UE may notify the macro eNB that it is in the interference suppression zone to start a pre-preparation process to minimize the macro to small cell hand-off delay.

The UE will send a notification to the serving macro cell as soon as the UE reliably captured the pilot(s) of the small cell(s) and a request to hand-off to the small cell. As soon as a UE is directed to hand-off to a small cell from the serving macro cell, it will rapidly tune down its transmission power via open loop power control and connect to the small cell.

Note, however, that due to typically close proximity of small cells in a cluster, a UE operating on an auto-route traversing the small cell cluster may be traveling at a speed for which multiple fast hand-offs among the traversed small cells create a greater problem, particularly in terms of system overhead, than that of reverse link interference from UE transmissions to the macro cell. Thus, in such circumstances, the network may command the UE to maintain its connection with the macro cell and avoid hand-offs to the small cells.

For an idle UE (RRC_Idle state), most of the idle UEs with low and medium speed should be guided to camp on the small cells in the overlapped macro/small cell coverage area. However, for those UEs camping on the macro cell, the interference suppression rule should be followed: If the access is initiated by the UE itself or by paging, then if the UE is located in the macro and small coverage overlapped area, the UE should reselect to the closest small cell first then start access and connection procedures. Once the idle UE has determined that it is in the interference suppression zone and has addressed any required power transmission adjustments, it should start to search for the neighboring small cells for hand-off to a small cell in the same manner as described above for UEs in the RRC_Active state. The UE may follow a modified access probing process with a reduced upper limit of ramping up power. Only a few closest small cells need being searched based on location info.

As indicated above, the inner boundary of the interference suppression zone will be located at, and coextensive with the outer boundary of the small cell cluster. Hereafter, the inventors disclose various methodologies for determining the scope of the interference suppression zone, and of the proximity of a given LIE to that zone. Each of those alternative methodologies for determining the scope of the interference suppression zone and operation of the UE in respect to that zone is considered a separate embodiment of the invention.

In a basic case, where the UE independently determines its proximity to the interference suppression zone, such proximity may be determined in terms of a pre-determined start-measurement distance (S-M distance) configured in the UEs. With this approach, a UE will periodically check its distance to the neighboring small cells. The measurement will be started if there is at least one small cell from which the distance between the UE and that cell is less than the S-M distance. When the UE enters the macro cell hosting the small cells, location information such as latitude and longitude of the reference small cells at the border of the small cell cluster will be delivered to the UE through broadcast or dedicated signaling. The UEs are assumed to be configured with GPS capability. After obtaining the latitude/longitude of the border small cells, the UE will periodically check its own location (latitude/longitude), and then calculate the distances to the reference small cells at the border. The distance to the closest reference small cell is used as S-M distance. If the S-M distance is less than the pre-configured threshold, the UE will know that it is in the interference suppression zone.

In alternative embodiments, the boundary of the interference suppression zone and the proximity of the UE to that zone are determined though coordination between the UE and the macro cell, and particularly the E-UTRAN wireless interface associated with the illustrative LTE system of the invention embodiments. In a first such case, the E-UTRAN will pre-define a nominal distance, D_nom, from the small cell boundary to the outer boundary of the suppression zone (i.e. a nominal width of the suppression zone). Then a UE having a connection with the macro cell will calculate the suppression distance, D_sup, applicable to its operation based on the following equation:

$$D\_sup = D\_nom + K1 * V\_UE - K2 * RSRP\_macro$$

where K1 and K2 are scaling factors which will be determined based on the valid range of the metrics involved (as discussed further below); V_UE represents the speed at which the UE is traveling; and RSRP_macro is the Reference Signal Receive Power on the downlink from the macro cell as received and measured by the UE.

(Note that D_sup should be larger when a UE's speed, V_UE, is high or if a UE is at the macro cell edge—i.e., conditions where the UE will necessarily have higher transmission power.)

As explained before, at the macro cell hosting the small cells, the E-UTRAN will broadcast the location (e.g., latitude/longitude) along with the cell IDs of all the macro-hosted small cells at the edge of the small cell cluster coverage. After entering the host macro cell, the UE will periodically calculate the distance between its current location and the small cells of concern, and then take the shortest distance against the suppression distance. If the distance between a UE and the closest small cell is less than D_sup (the suppression distance), the UE determines that it is in the suppression zone.

In another alternative embodiment, suppression zone parameters and UE proximity are determined as follows. The E-UTRAN will predefine and deliver to the UE a nominal small cell power measurement "alert" threshold, Nom_Pico_Alert_Thresh. Then the UE will calculate the final interference suppression zone decision threshold, Pico_Alert_Thresh, based on the following equation (FFS):

$$Pico\_Alert\_Thresh = Nom\_Pico\_Alert\_Thresh + K1 * RSRP\_macro - K2 * V\_UE$$

where K1 is a scaling factor for RSRP measurement; K2 is a scaling factor for the UE speed; V_UE and RSRP_macro are as defined above.

(Note that Pico_Alert_Thresh should be smaller when a UE's speed, V_UE, is high or if a UE is at the macro cell edge—i.e., conditions where the UE will necessarily have higher transmission power.)

The scaling factors, K1 and K2, in the D_sup and Pico_Alert_Thresh equations above are provided for generalizing the equations and allow engineering flexibility. The value of a given scaling factor is, in general, not dependent on specific HetNets. The engineering purpose of those scaling factors is to ensure different metrics working together in the same equation. More particularly, the K1 and K2 scaling factors are used to balance the effect of the RSRP and V_UE metrics in the equations. Different scaling factor values could be used to control the impact of different factors (speed and power). For example, considering the D_sup equation, if D_nom=50 m, and a valid range for V_UE is 0~120 km/h, should an operator determine to leave about 10 s time before the UE with the highest speed moves too close to the small cell cluster to trigger the power reduction mechanism, K1 could be set to 6. Similarly, for an exemplary valid range for RSRP_macro of −20~−100 dBm, K2 could be set to 1 to provide an additional 100 m from the small cell when the UE is at the macro cell edge. The K1, K2 scale factors may be further optimized via simulation and field test.

After entering the host macro cell, the UE will periodically search and measure the RSRP and/or the Reference Signal Receive Quality (RSRQ) of the pico (small) cells operating under the macro cell. The strongest pico cell RSRP/RSRQ measurement is then taken against the Pico_Alert_Thresh parameter. If the RSRP/RSRQ is higher than Pico_Alert_Thresh, the UE determines that it is in the suppression zone and sends a message to notify the network.

For this and the prior embodiment, the host macro cell will always broadcast small cell information, and the UE will start its search for small cells upon entering the macro cell.

In yet a further embodiment, suppression zone proximity and related action for the UE is determined as an expansion of the existing 3GPP procedure for hand-off of a UE from a serving base station to a neighbor base station (including a small cell). In this embodiment, the existing hand-off measurement reporting trigger event for the UE is applied with a different threshold. For example, reporting trigger event A4 may be applied with a lower threshold value (than for hand-off) as indicative that the UE has entered (or is proximate to) the interference suppression zone and the existing function of the handover measurement reporting trigger. With this approach, based on the measurement report, the network will make a determination of whether the UE is in the interference suppression zone or ready to hand-off based on the value, relative to a pre-configured threshold, of the reported UE measurement. If a determination is made that the UE is in the interference suppression zone, but RF link conditions are not adequate to support hand-off, the power reduction steps described above will be scheduled for the UE by the network.

Because the macro cell has information as to the locations of small cells within its coverage area, and can obtain location information from the UE as to its location (e.g., from GPS readings provided by UE), the macro cell may also by programmed to define an interference suppression zone with respect to its subtended small cells, and, based on location information from the UE, determine the UEs position with respect to the interference suppression zone. From such UE proximity data, the macro cell will then be in a position to schedule appropriate transmission power adjustments for the UE in accordance with the method of the invention.

Although possibly having lesser commercial application, it is also within the contemplation of the invention for UE proximity to the interference suppression zone to be determined by the cells in the small cell cluster. In this scenario, a small cell detects excessive interference and notifies the macro cell. Based on this report from the small cell, the macro cell then notifies the proximate UE and schedules appropriate transmission power adjustments. An issue with this approach may be that the small cell generating the excessive interference report does not know the identity of the UE causing the interference. It is believed that, to the extent the art does not presently provide a solution to this problem, that such a solution will arise with advances in the art.

If the UE is located in a macro cell hosting the small cells but in neither the suppression zone nor the coverage overlapped area, the UE will, of course, follow the normal access process.

Herein, the inventors have disclosed a system and method for improved interference management in a heterogeneous network comprising one or more macro cells and a cluster of one or more small cells. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method in a wireless communication system wherein at least one cell in the wireless communication system is characterized as a heterogeneous cell having a serving base station and including at least one small cell subtended within a coverage area of the serving base station, the method comprising:
   determining a geographical area circumscribing a boundary of the at least one small cell as constituting an interference suppression zone;
   causing a mobile station entering the interference suppression zone to adjust reverse-link transmission power; and
   wherein the wireless system determines a scope of the interference suppression zone and provides a threshold to a served mobile station from which the mobile station is enabled to determine proximity to the interference suppression zone based on comparison of calculated distance or downlink power measurements with the provided threshold, and wherein the provided threshold is a nominal suppression distance, D_nom, and the mobile determines an entry point into the interference suppression zone as a distance from the boundary of the at least one small cell, D_sup, as a function of D_nom, speed of the mobile terminal, and Reference Signal Receive Power (RSRP) on the downlink from a macro cell.

2. The method of claim 1 wherein a lowest priority traffic being sent by the mobile station is stopped during a period the mobile station is within the interference suppression zone.

3. The method of claim 2 wherein the lowest priority traffic is Best Effort traffic.

4. The method of claim 2 wherein reverse-link transmission power for higher priority traffic being sent by the mobile station is reduced to a minimal level required to support an acceptable quality of service (QoS) during a period the mobile station is within the interference suppression zone.

5. The method of claim 4 wherein the higher priority traffic includes at least one of Expedited Forwarding traffic or Assured Forwarding traffic.

6. The method of claim 4 wherein the higher priority traffic includes voice traffic, and the reduction in reverse-link transmission power is achieved by reducing a vocoder rate for the voice traffic.

7. The method of claim 1 wherein for a mobile station operating in Radio Resource Control (RRC-Idle) mode, if the mobile station is located in an area of overlapped coverage between a macro cell and one or more subtended small cells, the mobile station should select to a closest small cell first then start access and connection procedures with the selected small cell.

8. The method of claim 1 wherein for a mobile station operating in RRC-Idle mode, if the mobile station is located in the interference suppression zone, the mobile station will start to search for neighboring small cells.

9. The method of claim 1 wherein the mobile station determines D_sup according to the formula:

$$D\_sup = K * D\_nom * V\_UE / RSRP\_macro$$

where K is a scaling factor and V_UE represents the speed at which the mobile station is traveling.

10. The method of claim 1 wherein the provided threshold is a nominal small cell power measurement alert threshold, Nom_Pico_Alert_Thresh, and the mobile determines an entry point into the interference suppression zone based on a comparison of a measured Reference Signal Receive Power (RSRP) and/or Reference Signal Receive Quality (RSRQ) of a small cell subtended by the macro cell and a calculated threshold, Pico_Alert_Thresh, determined as a function of Nom_Pico_Alert_Thresh, speed of the mobile terminal, and measured RSRP on the downlink from the small cell.

11. The method of claim 10 wherein the mobile station determines Pico_Alert_Thresh according to the formula:

$$Pico\_Alert\_Thresh = Nom\_Pico\_Alert\_Thresh + K1 * RSRP\_macro - K2 * V\_UE$$

where K1 is a scaling factor for RSRP measurement; K2 is a scaling factor for UE speed; V_UE and RSRP_macro are as defined above.

12. The method of claim 1 wherein the wireless system determines a scope of the interference suppression zone and provides information to a served mobile station from which the mobile station is enabled to determine proximity to the interference suppression zone based on a modification of a measurement report triggering threshold established for determining hand-off of the mobile station to another base station.

13. The method of claim 12 wherein the measurement threshold is for reporting trigger event A4 and the threshold modification is a reduction from the hand-off threshold value.

14. The method of claim 1 wherein the wireless system determines a scope of the interference suppression zone and provides information to a served mobile station as to its proximity to the interference suppression zone based on mobile-station location information provided to the wireless system from the mobile station.

15. The method of claim 1 wherein proximity of a mobile station to the interference suppression zone is provided by one or more small cells subtended by a macro cell based on interference at the small cell attributed to reverse link transmission from the proximate mobile station.

* * * * *